Nov. 21, 1961     H. L. KOTKINS     3,009,551
LUGGAGE HANDLE
Filed Jan. 12, 1959
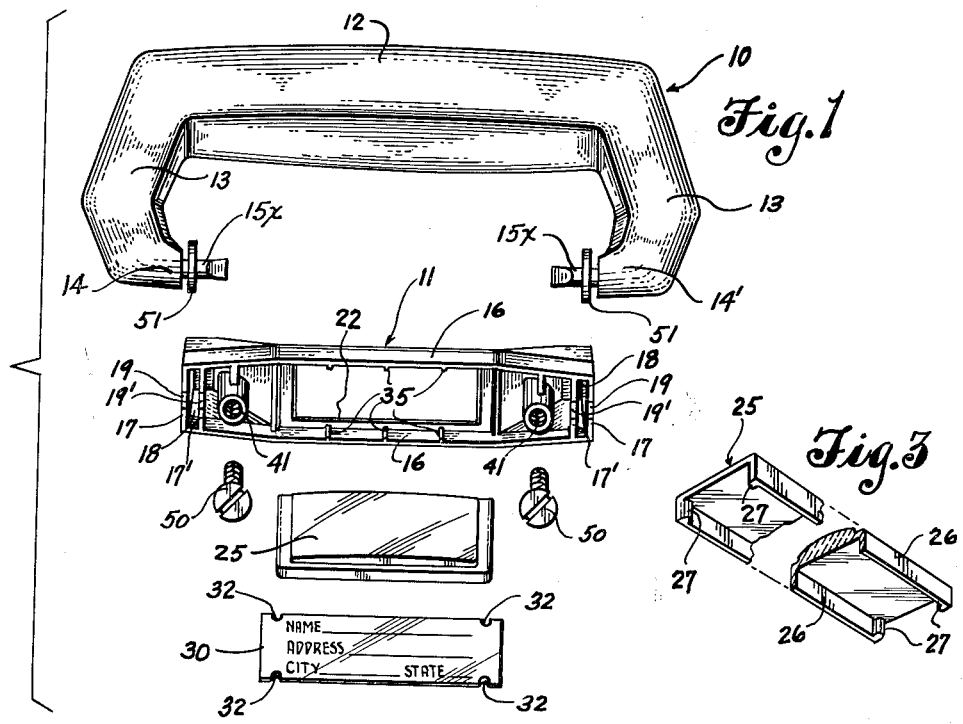
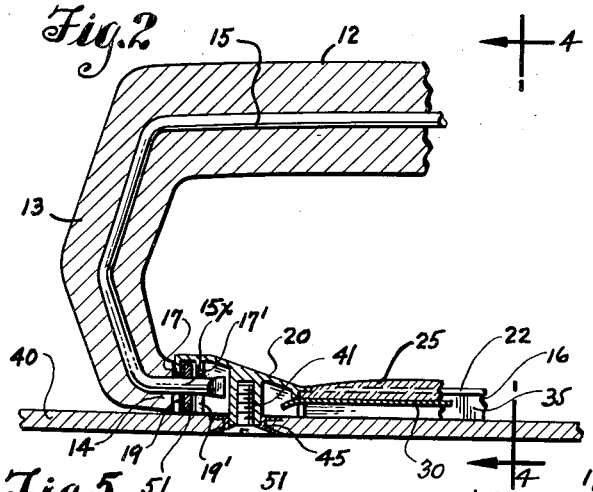
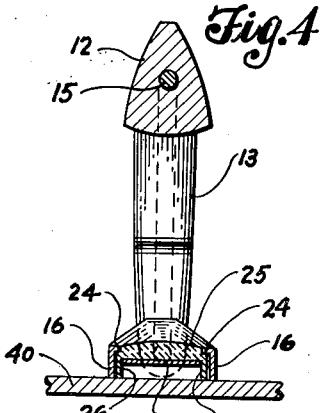
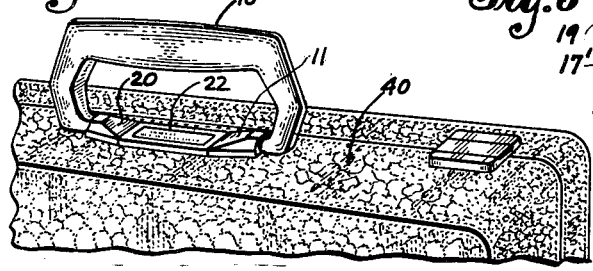
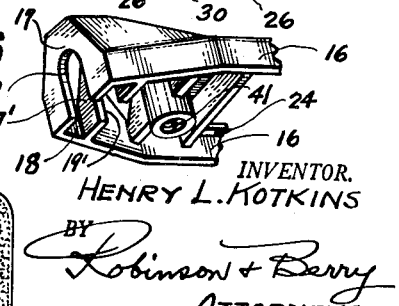
INVENTOR.
HENRY L. KOTKINS
BY
Robinson + Berry
ATTORNEYS

United States Patent Office 3,009,551
Patented Nov. 21, 1961

3,009,551
LUGGAGE HANDLE
Henry L. Kotkins, 10 Wall St., Seattle, Wash.
Filed Jan. 12, 1959, Ser. No. 786,223
1 Claim. (Cl. 190—58)

This invention relates to luggage handles and has reference more particularly to certain novel improvements therein, both in construction and combination of parts and in the incorporation within the handle mounting or base member, of novel means for protectively containing the luggage owner's identification tag.

It is the principal object of the present invention to provide a luggage handle that, besides having an attractive ornamental appearance, embodies novel details of construction in its several parts that facilitates their assembly; that gives greater durability and utility; that provides for protectively and visibly containing the luggage owner's identification tag by means that prevents its being removed except by the detachment of the handle mounting piece which requires removal of securing screws that are accessible only from inside the luggage piece.

Further objects and advantages of the invention reside in the details of construction of its parts and in their combination, mode of assembly and use, as will hereinafter be fully described.

In accomplishing the above mentioned and other objects of the invention, I have provided the improved details of construction, the preferred forms of which are illustrated in the accompanying drawings, wherein:

FIG. 1 is a view, in perspective, showing the various parts comprised in the present luggage handle in separated relationship for explanatory purposes and for better understanding.

FIG. 2 is a longitudinal sectional view of one end portion of the present luggage handle and showing the manner and means for its attachment to the top wall of a piece of luggage.

FIG. 3 is a perspective view of the transparent lens through which the identification tag as contained in the handle mounting is to be viewed; a part of the lens being broken away in order to show its cross-sectional shape.

FIG. 4 is a vertical cross-section of the present luggage handle as seen on line 4—4 in FIG. 2.

FIG. 5 is a perspective view of the present handle as applied to a piece of luggage.

FIG. 6 is a detail in perspective of one end portion of the handle mounting.

Referring more in detail to the drawings:

The present luggage handle comprises two principal parts herein designated in their entireties, respectively, as the handle member 10, and the handle mounting 11.

The handle member 10, as well shown in FIGS. 1 and 2, comprises a horizontal hand hold portion 12 of the cross-sectional form shown in FIG. 4, which has integrally formed, downwardly directed, coextensive legs 13—13 at its opposite ends. These legs are preferably of the outwardly inclined angular form shown in FIGS. 1 and 2, and terminate at their lower ends in short inturned lugs, designated in FIG. 1 at 14 and 14'.

The handle member preferably is molded from a suitable plastic material and contains therein a continuous reinforcing rod 15 that extends axially of the hand hold portion 12 and then continues axially of the legs 13—13. The end portions of this rod, designated at 15x—15x, extend through and inwardly from the flat, vertical inside faces of the lugs 14—14', as shown in FIG. 1, to serve as means for the attachment of the hand hold 12 to the mounting piece 11 as presently explained. The slight resiliency of the handle aids in holding the handle member in a set position and facilitates its assembly with the mounting 11.

The handle mounting member 11 preferably is die formed in the shape indicated. It is shown in FIG. 1 to be of inverted channel form, and rather shallow in depth. For better understanding and not as a limitation, it will be here stated that the member 11 as presently being made is four inches long and approximately 7/8 inch wide across its medial portion. It has parallel opposite sidewalls that are approximately 3/16 inch high. Along the opposite end portions of this member 11, the opposite sidewalls are slightly converging, as has been shown in FIG. 1, and at each of its ends the piece is closed by two spaced, parallel cross-walls. In the drawings, the opposite sidewalls of the mounting are designated by reference numerals 16—16; the spaced end walls at each end by numerals 17—17' and the spaces between walls 17—17' at the opposite ends, are designated at 18 in FIG. 6, is approximately one-eighth of an inch. It is to be observed, more particularly by reference to FIGS. 2 and 6, that the opposite end portions of the handle mounting 11 are increased in height to a level that is about twice that of its middle portion. This is to provide for the present means for attachment of the handle 12 thereto.

It is also to be observed by reference to FIGS. 1 and 6, that the walls 17—17' are formed with slots 19—19' leading upwardly thereinto in the central longitudinal plane of the piece 11 to a substantial distance; these slots being provided for a purpose presently explained.

The handle mounting 11 has a top wall 20 that completely closes the tops of those parts of increased height, as shown in FIG. 2, and that portion which extends between these end parts of increased height is provided with a longitudinal opening 22 that is well shown in FIG. 1. This opening, which is bounded by peripheral inwardly directed flanges 24 has a transparent magnifying lens 25 fitted therein which is applicable thereto only from the open underside of the mounting. The lens 25 is shaped as shown in FIGS. 2, 3 and 4; being formed along opposite side edges with parallel, downwardly directed flanges 26; these being formed along their end edges and inside surfaces with ribs 27 for a purpose presently explained.

After the lens 25 has been properly positioned in the opening 22 of mounting 11 and before the mounting is attached to the luggage, the owner's identification tag 30 is applied therein, as in FIGS. 3 and 4, by placing it flatly against its underside and lengthwise of the lens, with its opposite end portions extend beyond the ends of the lens, as indicated in FIG. 2.

The tag 30 is of such width that it fits snugly between the opposite side flanges 26—26 of the lens, and it is seen in FIG. 1 that it is formed near its end and in its opposite side edges with notches 32 for seating the vertical ribs 27 of the lens, thus to hold the tag properly in position. When assembling the lens and tag in the mounting, support of the lens between the sidewalls of the mounting is facilitated by the provision of a plurality of slightly projecting ribs 35 on the inside surfaces of the sidewalls 16—16 of the mounting, against which the side flanges of the lens engage; these ribs being shown in FIG. 1.

For the securement of the handle mounting 11 to a piece of luggage, as for example, to what may be the top wall 40 of the luggage piece shown in FIG. 2, the handle mounting 11 is formed within its opposite ends, between the end walls 17' and ends of the sight opening 22 with interiorly threaded and downwardly opening sockets 41—41. These extend below the plane of the bottom edge of the piece 11 and are adapted on applying the mounting to the wall 40 to enter grommets 45, applied in proper spacing to the wall. Anchoring screws 50 are then applied upwardly through the grommets and threaded into the sockets from inside the luggage piece.

It will be apparent, by reference to FIG. 2, that with the mounting 11 so fixed to the wall 40, the identification tag 30 cannot be removed therefrom without detachment of the mounting from the wall 40; and such detachment is not possible so long as the piece of luggage is closed and locked.

For affixing of the handle 10 to the mounting piece 11, the end portions 15x of the rod 15, which project beyond the inside faces of the handle lugs 14—14', as shown in FIG. 1, are seated within the slots 19—19' of the end walls 17—17'. This application is facilitated by slightly springing the ends of the legs 13—13 apart so that the lugs 14—14' will be clear of the end walls 17 of the mounting 11. These end portions 15x of rod 15 are each equipped with a washer 51, as best shown in FIG. 1 that is received in the spaces 18 between walls 17—17' as shown in FIG. 2. These washers will engage the top wall 20 of the mounting and also the wall 40 of the luggage piece, thus to support the end lugs 14—14' of the handle from rubbing the luggage wall. The inward tension of the lugs against the end surfaces of piece 11, afforded by the resiliency of the handle member, is sufficient to hold the latter in an upright position, as in FIG. 5, yet is not sufficient to prevent its being easily pushed down against the luggage wall when such is desired.

Luggage handles embodying the above described features may be made in various designs without departing from the invention. Also, they may be made in various sizes, and of various materials. The principal features in which novelty is believed to reside are: The protective securement of the identification tag; the details of the lens and tag that provide for the fitting of the tag in the lens; the details of construction that provide for securement of the handle in the mounting; that facilitates assembly of parts; and in the attractiveness and serviceability of the assembly.

What I claim as new is:

In combination a piece of luggage, a luggage handle and a handle mounting means, said handle comprising a hand hold portion, legs extending angularly from said hand hold portion at opposite ends thereof, a resilient rod extending through said handle and having opposite ends thereof projecting from the free ends of said legs, the opposite ends of said rod extending toward one another and substantially parallel with said hand hold portion, a rod supporting means on each of the opposite ends of said rod; said handle mounting means comprising an elongated shallow plate of channel-like form, end walls closing the opposite ends of said channel, a transverse partitioning wall parallel to and spaced inwardly from each of said end walls, aligned slots in the end walls and partitioning walls which extend upwardly from the free edges thereof, said slots providing means for seating and retaining the ends of said rod, said rod supporting means being positioned between the respective endwall and partitioning wall, and of sufficient size to support the free ends of said legs above the surface of the luggage to which the handle is attached and the confronting surfaces of each of said legs frictionally bearing against said endwalls to maintain the handle in set position, means integral with said channel inwardly spaced from each of said partitioning walls to receive plate attaching means for securing said handle mounting means to a piece of luggage.

References Cited in the file of this patent

UNITED STATES PATENTS

| | | |
|---|---|---|
| 200,688 | Bright | Feb. 26, 1878 |
| 305,341 | Schwerin | Sept. 16, 1884 |
| 825,563 | Townsend et al. | July 10, 1906 |
| 867,403 | Newson | Oct. 1, 1907 |
| 1,317,922 | Hegerhorst | Oct. 7, 1919 |
| 2,624,431 | Caro | Jan. 6, 1953 |
| 2,673,630 | Axtell | Mar. 30, 1954 |
| 2,747,310 | Tierney | May 29, 1956 |
| 2,913,080 | Louik et al. | Nov. 17, 1959 |